Figure 1:
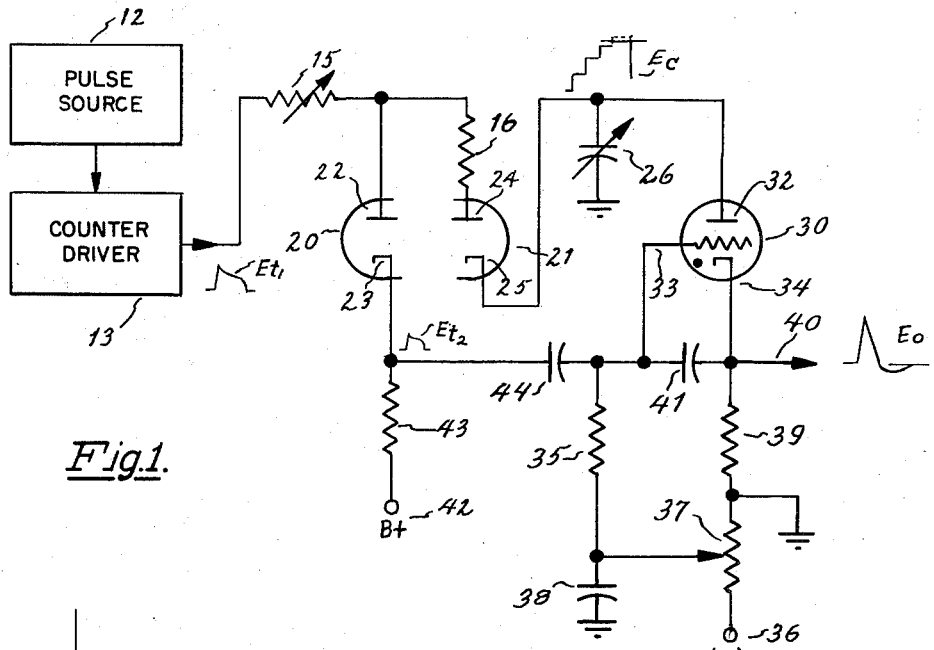

Aug. 26, 1958     H. A. BLEAM     2,849,653

COUNTER CIRCUITS

Filed March 21, 1955

INVENTOR.
Howard A. Bleam
BY
ATTORNEY

United States Patent Office 2,849,653
Patented Aug. 26, 1958

2,849,653

COUNTER CIRCUITS

Howard A. Bleam, Chicago, Ill., assignor to Admiral Corporation, Chicago, Ill., a corporation of Delaware Application March 21, 1955, Serial No. 495,626

12 Claims. (Cl. 315—84.5)

This invention relates to improvements in counter circuits, and more particularly to improvements in counter circuits having a pulse storage circuit for controlling the pulse count.

There are many types of counting circuits in the prior art. One group of these prior art counting circuits employs a storage capacitor and a rectifier means for feeding a train of uniform pulses into the storage capacitor. The capacitor is charged incrementally by each pulse supplied thereto until the charge attains a certain value, at which time a discharge circuit means functions to discharge the capacitor. The process then begins over again. The number of pulses required to charge the storage capacitor to the point where discharge occurs is dependent on the size of the capacitors, the energy contained in each pulse, and the construction of the discharge circuit means. Appropriate means are provided to produce an output pulse each time the capacitor discharges. The frequency of these output pulses constitute a sub-multiple of the frequency of the train of pulses supplied to the counter.

Some of the problems presented by this type counting circuit are jitter, delay, and miscount, due, largely, to poor control by the discharge circuit of the level of charge on the capacitor at which discharge will occur.

Several methods of controlling the level of charge at which the storage capacitor discharges are disclosed in the prior art. Some of these methods employ a one-shot multivibrator which is triggered and functions as the discharge path for the capacitor when the amount of charge on the storage capacitor reaches a certain level. Although these type circuits are an improvement over a simple gas-tube-type discharge circuit they, nevertheless, exhibit less control than is often desired. Other methods, which are more expensive, employ a control circuit consisting of two tubes, which, for many purposes, is sufficiently sensitive to the level of charge on the storage capacitor. The last-mentioned methods function to respond to the level of charge on the storage capacitor to produce a pulse which causes a discharge circuit to discharge. Another type control circuit utilizes a flip-flop type circuit employing at least two tubes. These type circuits are also expensive.

An object of the present invention is to provide a pulse storage type counter circuit having improved reliability of operation.

Another aim of the invention is an inexpensive pulse storage type counting circuit having a high level of reliability and accuracy.

A third object of the invention is to provide a pulse storage type counting circuit of a simple construction and having a high level of accuracy.

Another purpose of the invention is to provide a simple and inexpensive means for accurately controlling the level of charge at which the storage capacitor in a pulse storage type counter circuit discharges.

A further object of the invention is the improvement of pulse storage type counter circuits, generally.

In accordance with the invention, there is provided in combination with a counter circuit including a storage capacitor, first diode means for supplying a train of pulses to the storage capacitor to produce cumulative incremental charges thereon, and discharge means having a control element and constructed when conductive to discharge the charge on said storage capacitor, a control circuit constructed and arranged to respond to a predetermined amount of charge on said storage capacitor to supply one of the pulses of said train of pulses to said control element to cause said discharge means to discharge the charge on said storage capacitor.

In accordance with features of the invention, the discharge means and its control element comprise a gas tube having a control grid. The control circuit comprises a second diode, which is arranged so that the potential of the anode thereof will increase as the charge on the capacitor increases. The cathode of the second diode is biased positively. Thus, conduction through the second diode is prevented until the charge on the capacitor attains said predetermined value, at which time a pulse applied to the anode thereof will be conducted therethrough to said control element to cause said discharge means to become conductive.

In accordance with another feature of the invention, a capacitor is arranged to couple the cathode of the gas tube of the discharge means to the control grid thereof, thus eliminating excessive transient voltage between the control grid and the cathode during discharge of the storage capacitor.

These and other objects and features of the invention will be more fully understood from the following detailed description thereof, when read in conjunction with the drawings, in which:

Fig. 1 is a circuit diagram of a preferred embodiment of the counter constructed in accordance with the invention, and Figs. 2–5 are waveforms representing the time potential characteristics of signals developed at various circuit points of the counter circuit illustrated in Fig. 1.

Referring now to the drawings, wherein like reference characters designate like or corresponding parts throughout the several views, there is shown in Fig. 1, a pulse source 12, having an output of uniform pulses, preferably, but not necessarily, of substantially constant amplitude and duration. These uniform pulses are amplified in the counter driver circuit 13; to provide pulses of sufficient amplitude to drive the following step-by-step pulse counter circuit, e. g., the pulse $E_{t_1}$. A variable resistor 15 is placed in series with the driver 13 and a pair of diodes 20 and 21 wherein the resistor 15 is effective to increase the source impedance for both diodes, thereby controlling the charging current of pulses $E_{t_1}$. Resistor 16 is placed in the plate circuit of the diode 21 for decreasing the voltage at the plate of the diode 20 whereby the effective triggering voltage $E_{t_2}$ is higher on the diode 20.

The cathode 25 may be coupled directly to a variable storage capacitor 26 wherein the capacity is selected for storing a predetermined number of pulses $E_{t_1}$. The variable capacitor 26 may take the form of a plurality of different size capacitors and a selective switch for selecting one or more individual capacitors for storing a predetermined number of pulses $E_{t_1}$ before triggering tube 30. The variable resistor 15 may be used in conjunction or separately for determining the count or number of pulses for triggering tube 30 by limiting the charging current through diode 21 to the storage capacitor 26.

A gas triode 30, having an anode 32, grid 33 and cathode 34, may be connected directly to the output of diode 21 and storage capacitor 26, whereby the triggering time of tube 30 may be partially determined by voltage build up on capacitor 26 and the anode 32. The curve $E_C$ (see Fig. 3) represents the incremental steps of increasing voltage in capacitor 26 and on the anode 32 of tube 30, wherein each step is a result of the charging current produced by an individual pulse $E_{t_1}$ (see Fig. 2) passing through diode 21. A charging current flows through diode 21 during the pulse time of $E_{t_1}$, building up a charge on capacitor 26. At the end of the pulse $E_{t_1}$ the drop in voltage places the diode side of the capacitor 26 at positive potential equal to the charge accumulated on capacitor 26. Since the cathode 25 is positive with respect to the anode 24, between pulses $E_{t_1}$, capacitor 26 has no discharge path until tube 30 conducts at the end of the pulse count. It should be evident that the voltage of the storage capacitor will equal the voltage on the plate 24 of diode 21 less the voltage drop of the diode.

The grid 33 is connected to a negative bias supply 36 through resistor 35 and potentiometer 37. A filter capacitor 38 may be provided to ground between the resistor 35 and potentiometer 37 to eliminate undesired signals in the grid circuit.

As shown, the output of tube 30 is taken at the cathode 34, which is connected to cathode load resistor 39, the lower end of which is connected to ground. However, an output may be taken across a load placed anywhere in the discharge path of capacitor 26.

In order to prevent excessive voltage variations with respect to the grid 33 and cathode 34 on firing of tube 30, a boot strap circuit may be provided to maintain the grid to cathode potential within desirable limits by coupling the cathode 34 to the grid 33 through condenser 41. Consequently, on conduction of triode 30, the grid 33 potential will rise proportionally to signal level of the cathode, eliminating excessive grid currents which ordinarily would result, thereby increasing the tube life substantially.

To prevent delay, jitter, or miscount at the predetermined pulse count, a control circuit is provided which couples a pulse from the output of driver 13 to the grid 33 of tube 30 on the last pulse of the count. This circuit includes a diode 20 having a plate 22 connected between resistors 15 and 16 and a cathode 23 connected to a positive bias 42 through cathode load resistor 43. With the proper bias on the cathode 23, diode 20 functions as a limiter having an output signal $E_{t_2}$ on the last pulse of the count; $E_{t_2}$ is coupled to the grid 33 through coupling capacitor 44.

Since the anode 32 is near firing potential of the gas tube 30 at the end of the pulse count, the signal $E_{t_2}$ raises the grid potential above the critical voltage.

While applicant does not intend to limit the invention to any specific circuit constants, the following constants are given as illustrative of an embodiment of the invention constructed in accordance with circuit schematic of Fig. 1:

| | |
|---|---|
| Resistor 15 | 1,000 ohms, rheostat. |
| Resistor 16 | 100 ohms. |
| Resistor 35 | 10 kilo-ohms. |
| Resistor 37 | 100 kilo-ohms, potentiometer. |
| Resistor 43 | 47 kilo-ohms. |
| Condenser 26 | .01 microfarad. |
| Condenser 38 | .001 microfarad. |
| Condenser 41 | 56 micro-microfarads. |
| Condenser 44 | 470 micro-microfarads. |
| B+ 42 | 150 volts. |
| B− 36 | −45 volts. |
| Tubes 20—21 | 6AL5. |
| Tube 30 | 6D4. |
| $E_{t_1}$ | 200 volt pulse (peak). |
| $E_{o_1}$ | 75 volts (peak). |
| $E_{o_2}$ | 80 volts (peak). |
| $E_{t_2}$ | 10 volts (peak). |
| Peak potential on anode 24 of tube 21 | 140 volts. |
| Peak potential on anode 22 of tube 20 | 160 volts. |
| Peak potential on anode 32 of tube 30 | 110 volts. |

Operation

Figure 5:
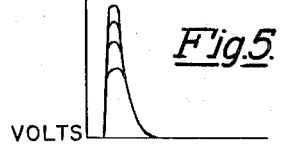

In considering the operation of the circuit of Fig. 1, it will be assumed initially that the pulse storage capacitor 26, resistor 15, and other circuit constants are adjusted for a pulse count of four (4). The first three pulses $E_{t_1}$, of the cycle pass through the diode 21 only, and are stored in capacitor 26. The charge on capacitor 26 is increased slightly during the time of each positive pulse $E_{t_1}$, producing a step voltage across the output. Actually, these steps decrease in size exponentially as the voltage across capacitor 26 approaches the final value, wherein the rate is dependent upon the output impedance of the driving circuit and/or the capacity of storage condenser 26. The peak amplitude of pulse $E_{t_1}$ on the anode 22, therefore, will be equal to the potential of capacitor 26, plus the voltage drop across diode 21 and resistor 16, as shown in Fig. 5.

On the fourth pulse the capacitor 26 is charged to a potential which is near the critical control voltage of the tube 30. To improve the stability of the critical firing point of tube 30, the positive voltage (B+) 42 on the cathode 23 permits conduction of diode 20 on the fourth pulse. The output of tube 20, a positive trigger pulse $E_{t_2}$, is coupled to the grid 33 through coupling capacitor 44. The amplitude of the trigger pulse $E_{t_2}$ exceeds the critical grid voltage of the gas tube 30. Thus, positive conduction of tube 30 at time $T_1$ (Fig. 3), eliminates excessive delay or jitter between the last pulse of the count $E_{t_1}$ and $E_o$, and assures an output pulse $E_o$ on the last pulse of the count $E_t$ for an accurate pulse count.

Upon conduction of tube 30, the cathode 34 is raised to the peak potential of the output pulse $E_{o_1}$, exceeding the rated cathode to grid potential. To prevent this undesirable condition of tube operation causing tube failure, the cathode is connected to grid by the capacitor 41, wherein the pulse $E_o$ is coupled to the grid to maintain the cathode to grid potential substantially constant during the output pulse period. The $E_o$ pulse potential on the grid will resume normal grid potential by current discharge through resistors 35 and 43.

Figures 2, 3, 4:
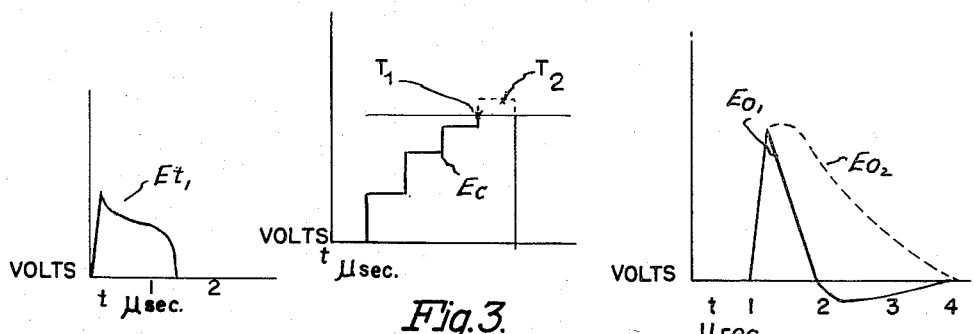

The waveforms in Figs. 2–5 are typical in the operation of the circuit of Fig. 1, and are not intended to limit the scope of the circuit. As indicated hereinbefore Fig. 2 illustrates an input pulse $E_{t_1}$. The storage capacitor potential $E_c$, shown in Fig. 3, indicates the instant of firing of tube 30 at time $T_1$ by the use of a grid control circuit and the time of firing $T_2$ without the use of the triggering pulse $E_{t_2}$ on the control grid, wherein the firing of tube 30 may depend on a voltage ripple or hum fed into the grid or anode circuit at time $T_2$. The output pulses $E_{o_1}$ and $E_{o_2}$, shown in Fig. 4, illustrate the varying types of waveforms resulting from a change in capacity of storage capacitor 26 and pulse count. $E_{o_1}$ represents an output pulse resulting from a lower energy storage and pulse count, as a result of the variations in the RC time constant of the gas tube circuit.

Obviously many modifications and variations of the present invention are possible in the light of the above teachings. It is therefore to be understood, that within the spirit thereof, the invention may be practiced otherwise than as specifically described.

I claim:

1. In combination with a counter circuit including a capacitor, first diode means for supplying a train of pulses to said capacitor to produce cumulative incremental charges thereon, means for supplying said train of pulses to said first diode means, and discharge circuit means having a control element and constructed to discharge the charge on said capacitor in response to a signal supplied to said control element, a control circuit constructed to respond to a predetermined amount of charge on said capacitor to supply at least one of the pulses of said train of pulses to said control element to cause said discharge circuit means to discharge the charge on said capacitor.

2. A combination in accordance with claim 1, in which said control circuit comprises a second diode means having an anode and a cathode, means for coupling said anode to said means for supplying said train of pulses, and means for coupling said cathode to said control element, and means for impressing upon said cathode a positive bias of a magnitude such that the said second diode means will conduct a pulse of said train of pulses only after said capacitor has acquired said predetermined amount of charge.

3. A combination in accordance with claim 1, in which said discharge circuit means comprises a gas tube including a cathode and an anode and in which said control element comprises a control grid in said gas tube, said gas tube constructed and arranged so that the potential of the anode thereof varies in accordance with the value of the charge on said capacitor.

4. A combination in accordance with claim 3, comprising capacitive means for coupling said cathode to said control grid to prevent overloading of said gas tube.

5. A counter circuit comprising a storage capacitor, asymmetrical circuit means for supplying a train of pulses to said storage capacitor, means for supplying said train of pulses to said asymmetrical circuit means, discharge circuit means including a control element and constructed and arranged to be responsive to a predetermined amount of charge on said storage capacitor to become conditioned to discharge the charge on said storage capacitor, and control circuit constructed to respond to said predetermined amount of charge on said storage capacitor to supply at least one pulse of said train of pulses to said control element to cause said discharge circuit means to discharge the charge on said storage capacitor.

6. A counter circuit in accordance with claim 5, in which said control circuit comprises a diode means having an anode and a cathode, means for coupling said anode to said means for supplying said train of pulses, and means for coupling said cathode to said control element, and means for impressing upon said cathode a positive bias of a magnitude such that the said diode means will conduct a pulse of said train of pulses only after said storage capacitor has acquired said predetermined amount of charge.

7. A counter circuit in accordance with claim 5, in which said discharge circuit means comprises a gas tube including a cathode and an anode and in which said control element comprises a control grid in said gas tube, said gas tube being constructed and arranged so that the potential of the anode thereof varies in accordance with the value of the charge on said storage capacitor.

8. A counter circuit in accordance with claim 7 comprising capacitive means for coupling said cathode to said control grid to prevent overloading of said gas tube.

9. In combination with a counter circuit including a storage capacitor, rectifier means for supplying a train of pulses to the storage capacitor to produce cumulative incremental charges thereon, means for supplying said train of pulses to said rectifier means, and discharge means connected across said storage capacitor, said discharge means having a control element and constructed to be responsive to a predetermined amount of charge on said storage capacitor to become conditioned to discharge the charge on said storage capacitor, a control circuit constructed to respond to said predetermined amount of charge on said storage capacitor to supply at least one of the pulses of said train of pulses to said control element to cause said discharge means to discharge the charge on said capacitor.

10. A combination in accordance with claim 9, in which said control circuit comprises a diode means having an anode and a cathode, means for coupling said anode to said means for supplying said train of pulses, and means for coupling said cathode to said control element, and means for impressing upon said cathode a positive bias of a magnitude such that the said diode means will conduct a pulse of said train of pulses only after said storage capacitor has acquired said predetermined amount of charge.

11. A combination in accordance with claim 9, in which said discharge means comprises a gas tube including a cathode and an anode and in which said control element comprises a control grid in said gas tube, said gas tube being constructed and arranged so that the potential of the anode thereof varies in accordance with the value of the charge on said storage capacitor.

12. A combination in accordance with claim 11 comprising capacitive means for coupling said cathode to said control grid to prevent overloading of said gas tube.

References Cited in the file of this patent

UNITED STATES PATENTS

| | | |
|---|---|---|
| 2,030,228 | Randolph et al. | Feb. 11, 1936 |
| 2,310,092 | Knowles et al. | Feb. 2, 1943 |
| 2,540,524 | Houghton | Feb. 6, 1951 |
| 2,567,667 | Hanchett | Sept. 11, 1951 |
| 2,573,150 | Lacy | Oct. 30, 1951 |
| 2,592,493 | Trevor | Apr. 8, 1952 |
| 2,653,236 | Phelan | Sept. 22, 1953 |